(12) United States Patent
Kishi et al.

(10) Patent No.: US 10,113,446 B2
(45) Date of Patent: Oct. 30, 2018

(54) ROTARY MACHINE SYSTEM

(71) Applicant: MITSUBISHI HEAVY INDUSTRIES COMPRESSOR CORPORATION, Tokyo (JP)

(72) Inventors: Toshiyuki Kishi, Hiroshima (JP); Tomohiro Masuda, Hiroshima (JP)

(73) Assignee: MITSUBISHI HEAVY INDUSTRIES COMPRESSOR CORPORATION, Tokyo (JP)

(*) Notice: Subject to any disclaimer, the term of this patent is extended or adjusted under 35 U.S.C. 154(b) by 324 days.

(21) Appl. No.: 14/894,252

(22) PCT Filed: Feb. 20, 2014

(86) PCT No.: PCT/JP2014/054001
§ 371 (c)(1),
(2) Date: Nov. 25, 2015

(87) PCT Pub. No.: WO2015/125246
PCT Pub. Date: Aug. 27, 2015

(65) Prior Publication Data
US 2016/0123149 A1    May 5, 2016

(51) Int. Cl.
*F01D 25/16* (2006.01)
*F01D 25/18* (2006.01)
(Continued)

(52) U.S. Cl.
CPC ............ *F01D 25/18* (2013.01); *F01D 25/16* (2013.01); *F16D 3/56* (2013.01); *F16H 57/029* (2013.01);
(Continued)

(58) Field of Classification Search
CPC . F01D 1/18; F01D 25/16; F01D 25/18; F16D 3/56; F16D 3/58; F16D 2300/06;
(Continued)

(56) References Cited

U.S. PATENT DOCUMENTS 4,495,830 A * 1/1985 Yasue ................. F16H 57/0423
                                                    74/467
5,154,517 A * 10/1992 Hodge ................ F16C 33/4623
                                                   384/470
(Continued)

FOREIGN PATENT DOCUMENTS

DE        3905770 A1 *  9/1989  ........... F16H 7/0404
DE     10203278 A1 *  9/2002  ............... F16D 3/56
(Continued)

OTHER PUBLICATIONS

International Search Report issued in PCT Application No. PCT/JP2014/054001 dated Apr. 2, 2014 with an English Translation.
(Continued)

*Primary Examiner* — Josh Skroupa
(74) *Attorney, Agent, or Firm* — Birch, Stewart, Kolasch & Birch, LLP

(57) ABSTRACT

A rotary machine system (1) includes a first rotary machine (4) having a driving shaft (5) capable of being driven about an axis, a second rotary machine (2) having a driven shaft (3) rotatable about the axis and a bearing device (11) slidably supporting the driven shaft (3) on an axial end portion side with a pad surface (37) such that lubricating oil is supplied to the pad surface (37), a coupling unit (6) connecting the driving shaft (5) and the driven shaft (3) to each other such that rotation of the driving shaft (5) is transmitted to the driven shaft (3), and a baffle plate (7) disposed between the bearing device (11) and the coupling unit (6) and separating a space on the bearing device (11) side and a space on the coupling unit (6) side from each other.

2 Claims, 5 Drawing Sheets

(51) Int. Cl.
*F16D 3/56* (2006.01)
*F16H 57/04* (2010.01)
*F16H 57/029* (2012.01)

(52) U.S. Cl.
CPC ..... *F16H 57/0423* (2013.01); *F16H 57/0471* (2013.01); *F16D 2300/06* (2013.01)

(58) Field of Classification Search
CPC . F16H 57/029; F16H 57/0421; F16H 57/0423
USPC .................. 464/7, 81, 85, 177, 178, 182
See application file for complete search history.

(56) References Cited

U.S. PATENT DOCUMENTS

| | | | |
|---|---|---|---|
| 5,281,110 A | 1/1994 | Dreiman | |
| 6,203,441 B1* | 3/2001 | Iarrera | B60B 27/0005 29/243.56 |
| 7,883,439 B2 | 2/2011 | Sheridan et al. | |
| 8,286,820 B2* | 10/2012 | Williams | F16J 13/14 220/367.1 |
| 8,821,332 B2* | 9/2014 | Kawamura | F16H 57/027 464/17 |

FOREIGN PATENT DOCUMENTS

| | | |
|---|---|---|
| JP | 56-89027 U | 7/1981 |
| JP | 61-119880 A | 6/1986 |
| JP | 4-124410 A | 4/1992 |
| JP | 6-248908 A | 9/1994 |
| JP | 9-144692 A | 6/1997 |
| JP | 2008-14489 A | 1/2008 |
| JP | 2012-211623 A | 11/2012 |

OTHER PUBLICATIONS

Written Opinion issued in PCT Application No. PCT/JP2014/054001 dated Apr. 2, 2014 with an English Translation.

* cited by examiner

ROTARY MACHINE SYSTEM

TECHNICAL FIELD

The present invention relates to a rotary machine system in which a plurality of rotary machines are connected to each other.

BACKGROUND ART

A compressor applied to a plant apparatus or the like is driven by a driving source such as a steam turbine. A rotary shaft of the steam turbine as a driving shaft and a rotary shaft of the compressor as a driven shaft are connected to each other via a coupling such as a flange-shaped flexible shaft joint so that torque of the steam turbine is transmitted (refer to, for example, PTL 1). Even in a case where the center lines of both shafts are unlikely to perfectly correspond to each other, a structure that allows the mismatch is available because of the use of the flange-shaped flexible shaft joint.

In general, a bearing device that performs lubrication by oil bath lubrication (forced lubrication) is used as a bearing device which is disposed in an end portion of a rotary shaft in, for example, a large rotary machine such as a uniaxial multistage centrifugal compressor.

CITATION LIST

Patent Literature

[PTL 1] Japanese Unexamined Patent Application Publication No. 2012-211623

SUMMARY OF INVENTION

Technical Problem

In a compressor that adopts a bearing device which performs lubrication by oil bath lubrication, however, lubricating oil spouting from the bearing device during an operation may reach a coupling. Because the coupling rotates at a high speed, the temperature of the lubricating oil increases due to friction when the lubricating oil reaches the coupling. When the temperature of the lubricating oil increases, deterioration of the lubricating oil is accelerated, which is not preferable in a case where the lubricating oil is recovered to be re-used.

An object of the present invention is to provide a rotary machine system that includes a bearing device to which lubricating oil is supplied and is capable of suppressing an increase in the temperature of the lubricating oil.

Solution to Problem

According to an aspect of the present invention, there is provided a rotary machine system including a first rotary machine having a driving shaft capable of being driven about an axis, a second rotary machine having a driven shaft rotatable about the axis and a bearing device slidably supporting the driven shaft on an axial end portion side with a pad surface such that lubricating oil is supplied to the pad surface, a coupling unit connecting the driving shaft and the driven shaft to each other such that rotation of the driving shaft is transmitted to the driven shaft, and a baffle plate disposed between the bearing device of the second rotary machine and the coupling unit and separating a space on the bearing device side and a space on the coupling unit side from each other.

According to this configuration, the baffle plate prevents contact between the lubricating oil spouting from the bearing device and the rotating coupling unit. Accordingly, frictional heat is not generated in the coupling unit, and thus an increase in the temperature of the lubricating oil can be suppressed.

In the rotary machine system described above, the coupling unit may be configured to have a disk-shaped disk portion protruding in a radial direction of the driving shaft and the driven shaft.

According to this configuration, more driving force can be transmitted to the driven shaft.

In the rotary machine system described above, the baffle plate may be configured to have a plurality of support units disposed at intervals in a circumferential direction and the baffle plate may be configured to be supported by an inner peripheral surface of a casing of the first rotary machine or the second rotary machine via the support units.

According to this configuration, gaps can be disposed between the baffle plate and the casing. Accordingly, an excessive increase in the pressure of the space between the baffle plate and the casing can be prevented. In addition, pressure can be released from the upper gap and the lubricating oil can be discharged from the lower gap.

Advantageous Effects of Invention

According to the present invention, the baffle plate prevents contact between the lubricating oil spouting from the bearing device and the rotating coupling unit. Accordingly, frictional heat is not generated in the coupling unit, and thus an increase in the temperature of the lubricating oil can be suppressed.

DESCRIPTION OF EMBODIMENTS

Hereinafter, a rotary machine system 1 according to an embodiment of the present invention will be described in detail with reference to accompanying drawings.

Figure 1:
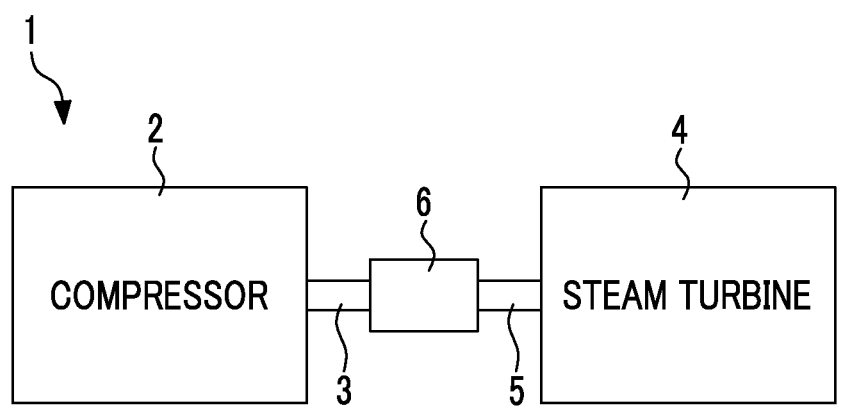
FIG. 1 is a schematic configuration diagram of a rotary machine system according to an embodiment of the present invention.

As illustrated in FIG. 1, the rotary machine system 1 according to this embodiment, which is a system that compresses gas such as air in a plant apparatus or the like, has a steam turbine 4 (first rotary machine) as a driving source and a compressor 2 (second rotary machine) that is driven by the steam turbine 4. The compressor 2 has a compressor rotary shaft 3 that is a driven shaft and the steam turbine 4 has a turbine rotary shaft 5 that is a driving shaft. The compressor rotary shaft 3 and the turbine rotary shaft 5 are connected to each other via a coupling unit 6.

The steam turbine 4 is a rotary machine that converts the energy of steam into a rotary motion via a turbine (impeller) and a shaft.

Schematically, the steam turbine 4 according to this embodiment is configured to be provided with a turbine casing 8 (refer to FIG. 2), the turbine rotary shaft 5 that is rotatably disposed in the turbine casing 8 and transmits power to the compressor 2, a stator blade (not illustrated) that is held in the turbine casing 8, a rotor blade (not illustrated) that is disposed in the turbine rotary shaft 5, and a bearing unit that supports the turbine rotary shaft 5 so that the turbine rotary shaft 5 is rotatable about an axis.

The compressor 2 is, for example, a uniaxial multistage centrifugal compressor that compresses gas such as air.

Schematically, the compressor 2 is configured to be provided with a compressor casing 9 (refer to FIG. 2), the compressor rotary shaft 3 that is rotatably disposed in the compressor casing 9 and rotates by the driving force of a turbine, a plurality of impellers (not illustrated) that are integrally attached to the compressor rotary shaft 3 to rotate with the compressor rotary shaft 3, and a bearing unit that supports the compressor rotary shaft 3 so that the compressor rotary shaft 3 is rotatable about an axis.

Figure 2:
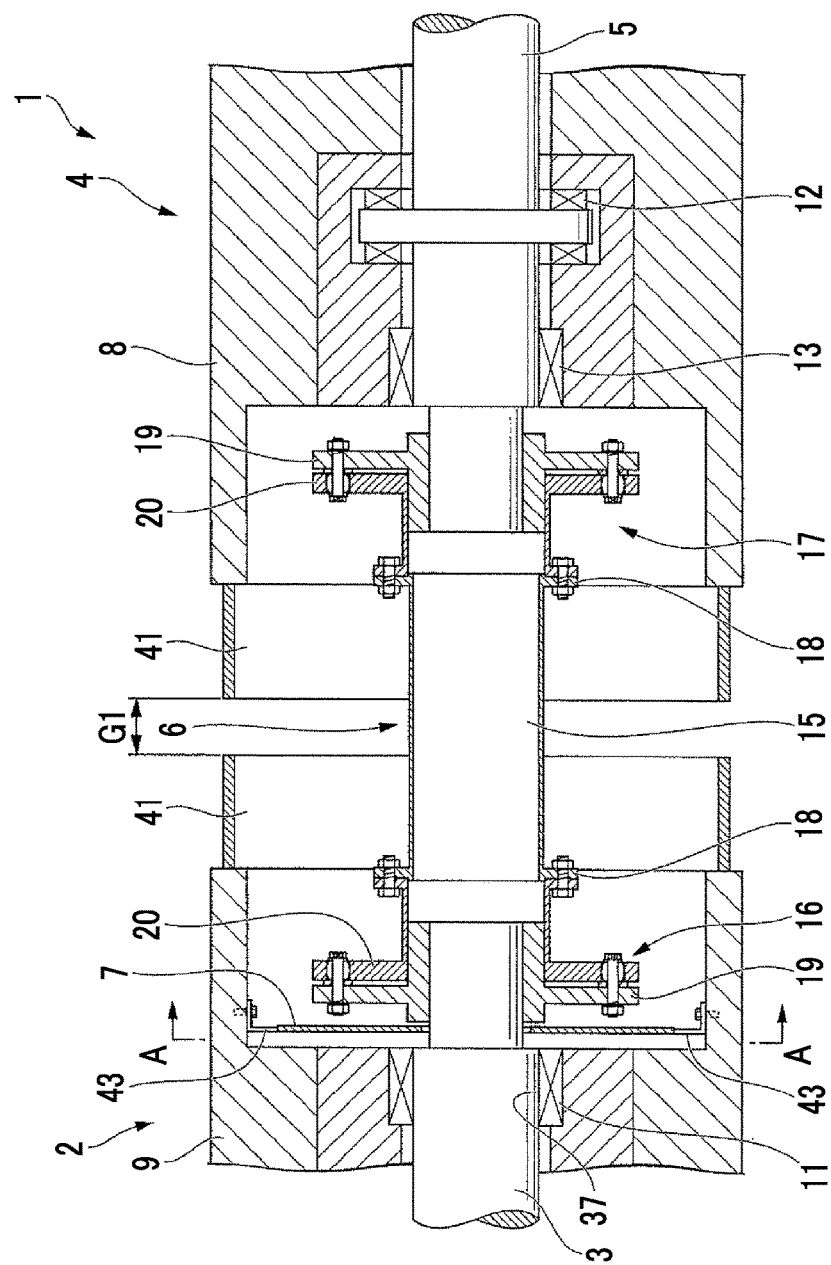
FIG. 2 is a detailed sectional view of a coupling unit of the rotary machine system according to the embodiment of the present invention, a compressor in the vicinity of the coupling unit, and a steam turbine in the vicinity of the coupling unit.

FIG. 2 is a detailed sectional view of the coupling unit 6 of the rotary machine system 1 according to this embodiment, the compressor 2 in the vicinity of the coupling unit 6, and the steam turbine 4 in the vicinity of the coupling unit 6.

As illustrated in FIG. 2, the compressor rotary shaft 3 of the compressor 2 has a radial load rotatably supported by a journal bearing 11. The journal bearing 11 is a bearing that is lubricated by oil bath lubrication (forced lubrication) and slidably supports the compressor rotary shaft 3 with a pad surface 37. An end portion of the compressor rotary shaft 3 that is not illustrated herein is supported (not illustrated) by a journal bearing 13 and a thrust bearing 12.

The turbine rotary shaft 5 of the steam turbine 4 has an axial load supported by the thrust bearing 12 and a radial load rotatably supported by the journal bearing 13. In the following description, the axial direction of the compressor rotary shaft 3 and the turbine rotary shaft 5 will be simply referred to as an axial direction.

The coupling unit 6 has an intermediate shaft 15, a first coupling 16 that connects the intermediate shaft 15 and the compressor rotary shaft 3 to each other, and a second coupling 17 that connects the intermediate shaft 15 and the turbine rotary shaft 5 to each other.

The intermediate shaft 15 has a tubular shape. Intermediate shaft flanged portions 18, which protrude in a radial direction, are formed in both axial end portions of the intermediate shaft 15. The shape of the intermediate shaft 15 is not limited to the tubular shape. The intermediate shaft 15 may have a solid structure.

Figure 3:
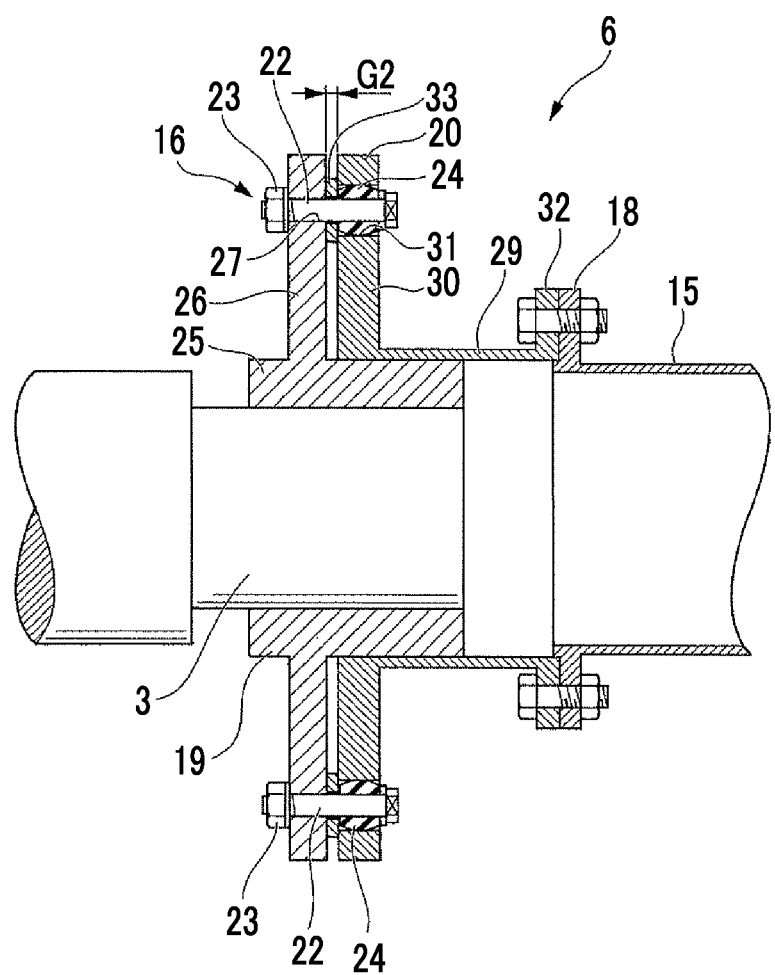
FIG. 3 is a detailed sectional view of a first coupling according to the embodiment of the present invention.

Hereinafter, the configuration of the first coupling will be described. The first coupling 16 and the second coupling 17 have the same configuration, and thus the second coupling 17 will not be described herein. FIG. 3 is an enlarged view of the first coupling 16. In FIG. 3, some of the components other than the first coupling 16 are not illustrated.

The first coupling 16 is a joint that is known as a flange-shaped flexible shaft joint. As illustrated in FIG. 3, the first coupling 16 has a first joint member 19 that is attached to the compressor rotary shaft 3 and a second joint member 20 that is connected to the first joint member 19 via a plurality of bolts 22 and nuts 23.

A bush 24 that has a tubular shape is attached to a shaft portion of the bolt 22. The bush 24 is formed of an elastic material such as vibration-proof rubber.

The first joint member 19 has a first hub portion 25 that has a tubular shape and a disk-shaped first disk portion 26 that is disposed to protrude in the radial direction from the outer peripheral surface of the first hub portion 25. The inner diameter of the first hub portion 25 is formed for the compressor rotary shaft 3 to be fitted thereinto. In other words, the end portion of the compressor rotary shaft 3 that is connected to the first hub portion 25 is formed to be fitted into the inner diameter of the first hub portion 25. Specifically, the end portion of the compressor rotary shaft 3 is fitted into the first hub portion 25 by hydraulic fitting.

The first disk portion 26 is offset-arranged on an axial central portion side of the compressor rotary shaft 3 when the first joint member 19 is attached to the compressor rotary shaft 3. In other words, the first disk portion 26 is arranged at a position close to the center of gravity of the compressor rotary shaft 3.

A plurality of first through-holes 27 that penetrate the first disk portion 26 in the axial direction are formed in the first disk portion 26. The first through-holes 27 are formed at regular intervals in a circumferential direction. The first through-holes 27 are holes that are used for the insertion of the bolts 22. The first through-hole 27 is formed to have an inner diameter that slightly exceeds the inner diameter of the shaft portion of the bolt 22.

The second joint member 20 has a second hub portion 29 that has a tubular shape and is formed to cover the first hub portion 25 of the first joint member 19 and a disk-shaped second disk portion 30 that is disposed to protrude in the radial direction from the outer peripheral surface of the second hub portion 29. The second disk portion 30 is disposed in one end portion of the second hub portion 29. Specifically, the second disk portion 30 is arranged in the end portion that is close to the center of gravity of the compressor rotary shaft 3.

The inner diameter of the second hub portion 29 is formed for the inner peripheral surface of the second hub portion 29 to be in contact with the outer peripheral surface of the first hub portion 25 when the first joint member 19 and the second joint member 20 are connected to each other. The second disk portion 30 is formed to have an outer diameter that is substantially equal to the outer diameter of the first disk portion 26. The second disk portion 30 is formed to be arranged at a predetermined gap G2 from the first disk portion 26 in the axial direction when the first joint member 19 and the second joint member 20 are connected to each other.

A plurality of second through-holes 31 that penetrate the first disk portion 26 in the axial direction are formed in the first disk portion 26. The second through-holes 31 are formed at regular intervals in the circumferential direction. The second through-holes 31 are holes that are used for the insertion of the bolts 22 and the bushes 24. The second through-hole 31 is formed to have an inner diameter that is substantially equal to the outer diameter of the bush 24 which is attached to the bolt 22.

A joint flanged portion 32, which protrudes in the radial direction, is formed in the end portion of the second hub portion 29 on the side opposite to the end portion of the second hub portion 29 where the second disk portion 30 is disposed.

A spacer 33 is pinched between the first disk portion 26 of the first joint member 19 and the second disk portion 30 of the second joint member 20. In other words, the first disk portion 26 of the first joint member 19 and the second disk portion 30 of the second joint member 20 are connected to each other via the spacer 33 instead of being in direct contact with each other. The spacer 33 has a disk shape and has a through-hole, which is used for the insertion of the bolt 22, in a central portion.

The first coupling 16 is allowed to deviate even in a case where the central axis of the compressor rotary shaft 3 and the central axis of the intermediate shaft 15 do not correspond to each other because the first joint member 19 and the second joint member 20 are tightened to each other via the bush 24.

The intermediate shaft 15 and the first coupling 16 are connected to each other with the intermediate shaft flanged portions 18 of the intermediate shaft 15 and the joint flanged portion 32 of the first coupling 16 fastened to each other by the use of a fastening member such as a bolt and a nut.

Figure 4:
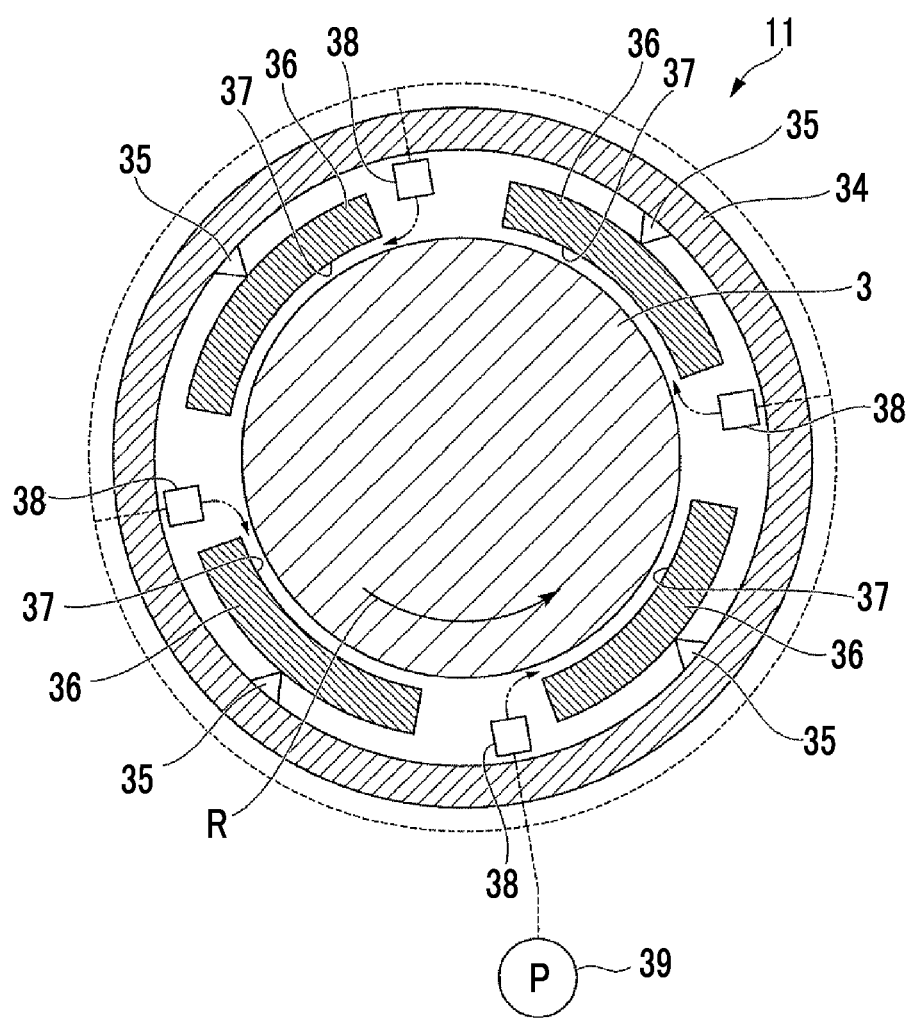
FIG. 4 is a schematic sectional view showing a journal bearing disposed in the compressor according to the embodiment of the present invention.

As illustrated in FIG. 4, the first journal bearing 11 has an annular bearing casing 34, pivots 35 that are disposed at regular angular intervals on the inner peripheral surface of the bearing casing 34, and a bearing pad 36 that is supported to be capable of oscillating by each of the respective pivots 35.

The pivots 35 are interposed between the bearing pad 36 and the bearing casing 34. The bearing pad 36 is divided in the circumferential direction. In this embodiment, the bearing pad 36 is divided into four pieces. The bearing pads 36 are supported by the respective pivots 35.

When viewed in the line of sight that is parallel to the axis of the compressor rotary shaft 3, each of the bearing pads 36 has an arc shape and the shape of a wide curved plate. The pad surface 37 of the bearing pad 36 is formed to have a radius of curvature that slightly exceeds the radius of curvature of the outer peripheral surface of the compressor rotary shaft 3. In other words, the pad surface 37 of the bearing pad 36 is not entirely in contact with the compressor rotary shaft 3. The pad surface 37 of the bearing pad 36 is formed of a soft metal such as white metal (Babbitt metal).

The pivot 35 is formed to protrude in the radial direction of the compressor rotary shaft 3 from the bearing casing 34 and supports the bearing pad 36 at the center of the back face of the bearing pad 36.

The configuration described above allows the bearing pad 36 to oscillate in any direction. In other words, the pivots 35 and the bearing pads 36 are in a point contact state, and the bearing pads 36 can comply with the rotary shaft in the event of a misalignment (uneven axial gaps between the outer peripheral surface of the compressor rotary shaft 3 and the pad surfaces 37 of the bearing pads 36) between the compressor rotary shaft 3 and a bearing device.

Oiling nozzles 38 as lubricating oil supply units are disposed toward the compressor rotary shaft 3 between the respective bearing pads 36, and a lubricating oil supply pump 39 is connected to these oiling nozzles 38. Accordingly, lubricating oil is supplied from the oiling nozzles 38 toward the pad surfaces 37 of the bearing pads 36, which are adjacent to the downstream side of the oiling nozzles 38 in the direction of rotation R of the compressor rotary shaft 3, when the lubricating oil supply pump 39 is driven.

Referring back to FIG. 2, guard members 41 are attached to the compressor casing 9 and the turbine casing 8. The guard members 41 have a tubular shape and are attached to cover the distance between the compressor casing 9 and the turbine casing 8. A predetermined gap G1 is disposed between a pair of the guard members 41.

The gap G1 between the guard members 41 has two functions and one of the two functions is to suppress an excessive increase in the pressure of the space that is formed by the casings 8 and 9 and the guard members 41. In other words, the upper gap G1 functions as an exhaust port (air vent, vent). The function as the exhaust port is not limited to that of the gap G1. For example, exhaust ports may be formed in the casings 8 and 9.

The other function of the gap G1 between the guard members 41 is the discharge of the lubricating oil that is discharged from the journal bearings 11 and 13. In other words, the lower gap G1 functions as a lubricating oil discharge port. The function as the discharge port is not limited to that of the gap G1. For example, discharge ports may be formed in the casings 8 and 9.

Figure 5:
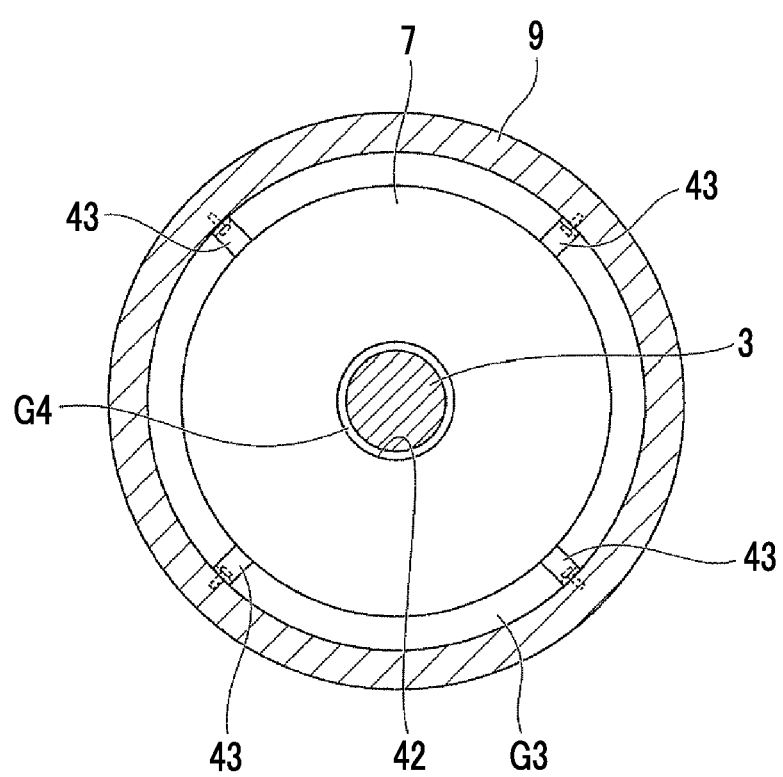
FIG. 5 is a sectional view taken along line A-A in FIG. 2, in which the shape of a baffle plate viewed in an axial direction is illustrated.

A baffle plate 7 (shielding plate), which is disposed between the journal bearing 11 and the coupling unit 6 and separates a space on the journal bearing 11 side and a space on the coupling unit 6 side from each other, is attached to the compressor 2 of the rotary machine system 1 according to this embodiment. As illustrated in FIG. 5, the baffle plate 7 is a circular plate-shaped member that has a central circular hole 42. As illustrated in FIG. 2, the baffle plate 7 is arranged between the first journal bearing 11 of the compressor 2 and the first coupling 16 in the axial direction.

The baffle plate 7 is attached to the inner peripheral surface of the compressor casing 9 via a plurality of supporting members 43. The supporting member 43 is attached to the inner peripheral surface of the compressor casing 9 by a fastening member such as a bolt.

The baffle plate 7 is formed to have an outer diameter that slightly exceeds the outer diameter of the first disk portion 26 of the first coupling 16.

The outer diameter of the baffle plate 7 is dimensioned so that a gap G3 (refer to FIG. 5) is allowed to be formed between the inner peripheral surface of the compressor casing 9 and the baffle plate 7. Because the gap G3 is formed between the inner peripheral surface of the compressor casing 9 and the baffle plate 7, the lubricating oil spouting from the first journal bearing 11 reaches the baffle plate 7, flows on the inner peripheral surface of the compressor casing 9, and then is discharged via the lower gap G3 and the gap G1 between the guard members 41. The discharged lubricating oil is re-used for the lubrication of the bearing device. The recovered lubricating oil may be discarded instead of being re-used.

Because the gap G3 is formed between the baffle plate 7 and the inner peripheral surface of the compressor casing 9, air can be discharged from the upper gap G3 and an excessive increase in the pressure of the space that is formed by the compressor casing 9 and the baffle plate 7 can be suppressed.

The supporting members 43 are integrally formed with the baffle plate 7. Specifically, the baffle plate 7 and the supporting members 43 are integrally formed by sheet metal working. The supporting members 43 are formed at intervals in the circumferential direction. In this embodiment, the number of the supporting members 43, which are formed at intervals (approximately 90°) in the circumferential direction, is four.

The inner diameter of the hole 42 of the baffle plate 7 is dimensioned to slightly exceed the outer diameter of the compressor rotary shaft 3. A minute gap G4 is formed between the compressor rotary shaft 3 and the baffle plate 7. It is preferable that the minute gap G4 is minimized as much as possible while allowing contact between the baffle plate 7 and the compressor rotary shaft 3 to be avoided.

According to the embodiment described above, the baffle plate 7 prevents contact between the lubricating oil spouting from the first journal bearing 11 and the first coupling 16 of the rotating coupling unit 6. Accordingly, frictional heat attributable to adhesion of the lubricating oil onto the first coupling 16 is not generated when the compressor rotary shaft 3 rotates at a high speed, and thus an increase in the temperature of the lubricating oil can be suppressed. Accordingly, deterioration of the re-used lubricating oil can be suppressed.

In addition, the first coupling 16 has the disk portions 26 and 30, and thus more driving force can be transmitted to the driven shaft.

In addition, the gap G3 is disposed between the baffle plate 7 and the compressor casing 9, and thus an excessive increase in the pressure of the space between the baffle plate 7 and the compressor casing 9 can be prevented. In addition, pressure can be released from the upper gap G3 and the lubricating oil can be discharged from the lower gap G3.

Since the first disk portion 26 is arranged at a position close to the center of gravity of the compressor rotary shaft 3, weight distribution on an axial end portion side can be improved by the first journal bearing 11 as a support unit.

The embodiment of the present invention has been described in detail with reference to the accompanying drawings. Configurational addition, omission, substitution, and modification can be carried out without departing from the spirit of the present invention.

For example, an electric motor or the like can also be adopted as the driving source although the steam turbine 4 is adopted as the driving source in the embodiment described above.

In the embodiment described above, the coupling unit 6 is configured to have the intermediate shaft 15. However, the second joint member 20 of the first coupling 16 and the second joint member 20 of the second coupling 17 may be integrated with each other while the intermediate shaft 15 is not disposed. In addition, the turbine rotary shaft 5 of the steam turbine 4 and the compressor rotary shaft 3 of the compressor 2 may be configured to be directly connected to each other by a coupling.

The baffle plate 7 may be disposed on the steam turbine 4 side or may be disposed on each of the compressor 2 side and the steam turbine 4 side.

REFERENCE SIGNS LIST

1 Rotary machine system
2 Compressor (second rotary machine)
3 Compressor rotary shaft (driven shaft)
4 Steam turbine (first rotary machine)
5 Turbine rotary shaft (driving shaft)
6 Coupling unit
7 Baffle plate
8 Turbine casing
9 Compressor casing (casing)
11 First journal bearing
12 Thrust bearing
13 Second journal bearing
15 Intermediate shaft
16 First coupling
17 Second coupling
18 Intermediate shaft flanged portion
19 First joint member
20 Second joint member
22 Bolt
23 Nut
24 Bush
25 First hub portion
26 First disk portion
27 First through-hole
29 Second hub portion
30 Second disk portion
31 Second through-hole
32 Joint flanged portion
33 Spacer
34 Bearing casing
35 Pivot
36 Bearing pad
37 Pad surface
38 Oiling nozzle
39 Lubricating oil supply pump
41 Guard member
42 Hole
43 Supporting member

The invention claimed is:

1. A rotary machine system comprising:
a first rotary machine including a driving shaft capable of being driven about an axis;
a second rotary machine including a driven shaft rotatable about the axis and a bearing device slidably supporting the driven shaft on an axial end portion side with a pad surface such that lubricating oil is supplied to the pad surface;
a coupling unit connecting the driving shaft and the driven shaft to each other such that rotation of the driving shaft is transmitted to the driven shaft; and
a baffle plate disposed between the bearing device and the coupling unit and separating a space on the bearing device side and a space on the coupling unit side from each other, wherein
the second rotary machine includes a casing provided with a tubular portion that has a tubular shape and forms a gap in a radial direction between the tubular portion and the baffle plate,
the baffle plate includes a plurality of support units disposes at intervals in a circumferential direction,
the baffle plate is supported by an inner peripheral surface of the casing via the support units, and
the tubular portion has a discharge part that is configured to discharge the lubricating oil.

2. The rotary machine system according to claim 1, wherein the coupling unit includes a disk-shaped disk portion protruding in a radial direction of the driving shaft and the driven shaft.

* * * * *